(12) United States Patent
Nakatani et al.

(10) Patent No.: US 9,355,342 B2
(45) Date of Patent: May 31, 2016

(54) IMAGE FORMING APPARATUS THAT AUTOMATICALLY PROMPTS MIGRATION OF BOX BETWEEN IMAGE FORMING APPARATUSES AT APPROPRIATE TIMING

(71) Applicant: KYOCERA Document Solutions Inc., Osaka (JP)

(72) Inventors: Ryusuke Nakatani, Osaka (JP); Keisaku Matsumae, Osaka (JP); Yasushi Tsukamoto, Osaka (JP); Junpei Takagi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 141 days.

(21) Appl. No.: 13/904,658

(22) Filed: May 29, 2013

(65) Prior Publication Data
US 2013/0321866 A1  Dec. 5, 2013

(30) Foreign Application Priority Data
May 31, 2012  (JP) .................................. 2012-125490

(51) Int. Cl.
*G06F 3/12* (2006.01)
*G06K 15/00* (2006.01)
*H04N 1/21* (2006.01)
*H04N 1/44* (2006.01)

(52) U.S. Cl.
CPC .............. *G06K 15/40* (2013.01); *G06K 15/405* (2013.01); *H04N 1/2187* (2013.01); *H04N 1/4433* (2013.01)

(58) Field of Classification Search
CPC ....... G06K 15/40; G06K 15/00; G06K 15/02; G06K 3/12
See application file for complete search history.

(56) References Cited

U.S. PATENT DOCUMENTS

| | | | | |
|---|---|---|---|---|
| 2006/0082805 A1* | 4/2006 | Kobayashi | ......... | G03G 15/5087 358/1.14 |
| 2008/0055661 A1* | 3/2008 | Yoshida | ............. | H04N 1/00912 358/403 |
| 2008/0239374 A1* | 10/2008 | Yamaguchi | .......... | H04N 1/2179 358/1.15 |
| 2009/0300081 A1* | 12/2009 | Ueoka | ............... | G06F 17/30079 |
| 2010/0284035 A1* | 11/2010 | Kil | ........................ | H04N 1/2166 358/1.15 |
| 2013/0308147 A1* | 11/2013 | Wu | ........................ | G06F 3/1203 358/1.13 |

FOREIGN PATENT DOCUMENTS

JP   2008-042775   2/2008

* cited by examiner

*Primary Examiner* — Barbara Reinier
*Assistant Examiner* — Henok A Shiferaw
(74) *Attorney, Agent, or Firm* — McDonnell Boehnen Hulbert & Berghoff LLP (57) ABSTRACT

Provided is an image forming apparatus. The image forming apparatus includes a box configured to store data, a usage amount count unit, a threshold value storage unit, a comparison unit, a box search unit, a user interface unit, and a box migration unit. The usage amount count unit counts a usage amount for a user identification. The threshold value storage unit stores a threshold value associated with the usage amount. The comparison unit determines whether or not the usage amount is equal to or larger than the threshold value. The box search unit acquires, based on the usage amount and threshold, box identification information on the box corresponding to the user identification within another image forming apparatus. The box migration unit migrates data on the box within the other image forming apparatus to the box corresponding to the user identification within the image forming apparatus.

13 Claims, 9 Drawing Sheets

IMAGE FORMING APPARATUS

| No | GROUP ID | USER ID | BOX ID | ......... |
|---|---|---|---|---|
| 001 | design01 | taro.yamada | device03 | ......... |
| 002 | design01 | ichiro.sugi | device05 | ......... |
| 003 | develop01 | jiro.sato | detector01 | ......... |
| ⋮ | ⋮ | ⋮ | ⋮ | ⋮ |

510 BOX INFORMATION TABLE

| taro.yamada | | MIGRATE DATA | | | | |
|---|---|---|---|---|---|---|
| ALL | | MIGRATION SOURCE | | MIGRATION DESTINATION | | |
| MIGRATE | No | APPARATUS NAME | BOX NAME | APPARATUS NAME | BOX NAME | |
| ◉ | 001 | KM02 | device03 | KM01 | device03 | ▼ |
| ◉ | 002 | KM02 | device04 | KM01 | | ▼ |
| ☐ | 003 | KM03 | document01 | KM01 | | ▼ |
| ☐ | 004 | KM03 | document02 | KM01 | | ▼ |

CANCEL   OK

5100  BOX MIGRATION TABLE

IMAGE FORMING APPARATUS THAT AUTOMATICALLY PROMPTS MIGRATION OF BOX BETWEEN IMAGE FORMING APPARATUSES AT APPROPRIATE TIMING

INCORPORATION BY REFERENCE

This application is based upon, and claims the benefit of priority from, corresponding Japanese Patent Application No. 2012-125490, filed in the Japan Patent Office on May 31, 2012, the entire contents of which is incorporated herein by reference.

FIELD

The present disclosure relates to an image forming apparatus and a method that automatically prompt migration of a box between image forming apparatuses at an appropriate timing.

BACKGROUND

A typical image forming apparatus has a box function. A box stores data such as document data and image data. The box function is a function in which an attribute such as the storage life of data stored in a given box is added to a directory within a file system of an operating system. Processing corresponding to the attribute is then performed by a box program.

In one example, a box that is no longer necessary on a given image forming apparatus is migrated to a different image forming apparatus via a network along with any stored data and the like, based on a designation specified by a user.

More specifically, the image forming apparatus that controls the storing and reading of data to and from the box receives an instruction to delete or migrate a box program stored in a box storage area. In response to the received instruction, a user of the image forming apparatus designates the deletion or migration of a program, document data, setting information, or the like relating to the box program stored in the box. Then, based on the designation performed by the user, at least one of the program, document data, and setting information relating thereto is deleted or migrated.

However, in the above-described technology, the box is migrated when the user selects an extended function and operates a key on an operation panel. Therefore, the function for box migration is not typically used unless the user knows the function for the box migration. Accordingly, it may be desirable to have an image forming apparatus configured to prompt migration of a box.

SUMMARY

The present disclosure relates to an image forming apparatus and a method that automatically prompt a user to use a box migration function at an appropriate timing even if the user does not know that the image forming apparatus has the box migration function.

According to a first embodiment of the present disclosure, an image forming apparatus configured to be coupled to a network includes a box configured to store data, a display unit, a usage amount count unit, a threshold value storage unit, a comparison unit, a box search unit, a user interface unit, and a box migration unit. The box corresponds to the user identification. The usage amount count unit is configured to count a usage amount for user identification registered in the image forming apparatus. The threshold value storage unit is configured to store a threshold value associated with the usage amount. The comparison unit is configured to determine whether or not the usage amount is equal to or larger than the threshold value. The box search unit is configured to acquire, when the usage amount corresponding to the user identification is equal to or larger than the threshold value, box identification information on the box corresponding to the user identification within another image forming apparatus coupled to the network. The user interface unit is configured to display a list of the acquired box identification information on the display unit. The box identification can be selected from the list through the display unit. The box migration unit is configured to migrate, via the network, data on the box within the other image forming apparatus specified by the selected box identification information to the box corresponding to the user identification within the image forming apparatus.

According to a second embodiment of the present disclosure, an image forming apparatus configured to be coupled to a network includes a box configured to store data, a display unit, a user ID addition determination unit, a box search unit, a user interface unit, and a box migration unit. The user ID addition determination unit is configured to determine whether or not a user identification has been newly registered in the image forming apparatus. The box corresponds to the user identification. The box search unit is configured to acquire, when the user identification has been newly registered, box identification information that defines a box corresponding to the user identification within another image forming apparatus coupled to the network. The user interface unit is configured to display a list of the acquired box identification information on the display unit. The box identification can be selected from the list through the display unit. The box migration unit is configured to migrate, via the network, data on the box within the other image forming apparatus specified by the selected box identification information to the box corresponding to the user identification within the image forming apparatus.

According to a third embodiment of the present disclosure, an image forming apparatus configured to be coupled to a network includes a box configured to store data, a display unit, a usage amount count unit, a threshold value storage unit, a comparison unit, a box search unit, a user interface unit, and a box migration unit. The box corresponds to a user identification. The usage amount count unit is configured to count a usage amount in the image forming apparatus. The threshold value storage unit is configured to store a threshold value of the usage amount. The comparison unit is configured to determine whether or not the usage amount is equal to or larger than the threshold value. The box search unit is configured to acquire, when the usage amount is equal to or larger than the threshold value, box identification information that defines a box corresponding to user identification registered within another image forming apparatus coupled to the network. The user interface unit is configured to display a list of the acquired box identification information on the display unit. The box identification can be selected from the list through the display unit. The box migration unit is configured to migrate, via the network, data on the box corresponding to the user identification within the image forming apparatus to the box of the other image forming apparatus specified by the selected box identification information.

Additional features and advantages are described herein, and will be apparent from the following Detailed Description and the figures.

DETAILED DESCRIPTION

First Embodiment

Figure 1:
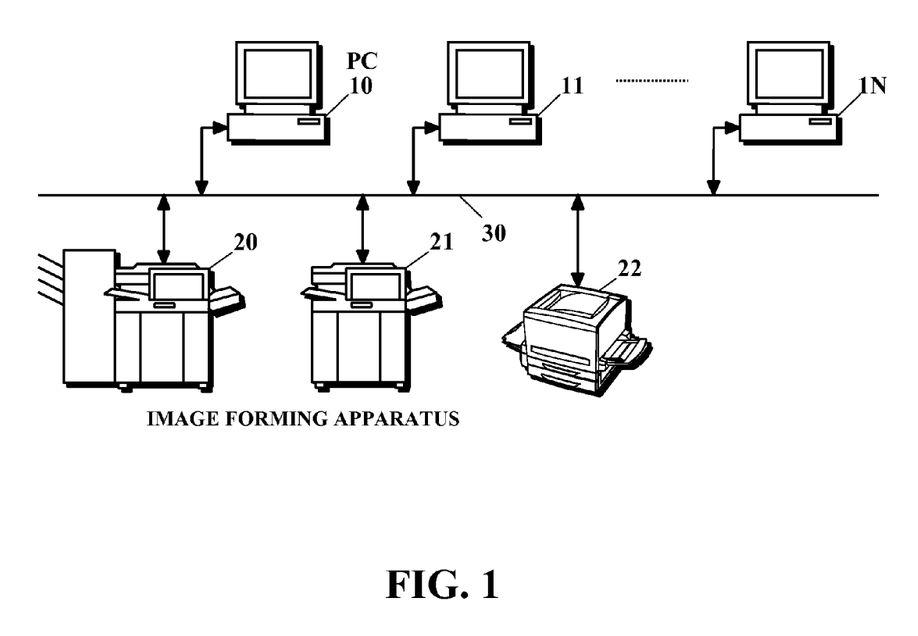
FIG. 1 illustrates a schematic diagram of a configuration of an image forming system according to a first embodiment of the present disclosure.

FIG. 1 illustrates a schematic diagram of a configuration of an image forming system according to a first embodiment of the present disclosure.

The image forming system includes personal computers (PCs) 10 to 1N and image forming apparatuses 20 to 22 that are coupled to one another via a network 30.

Figure 2:
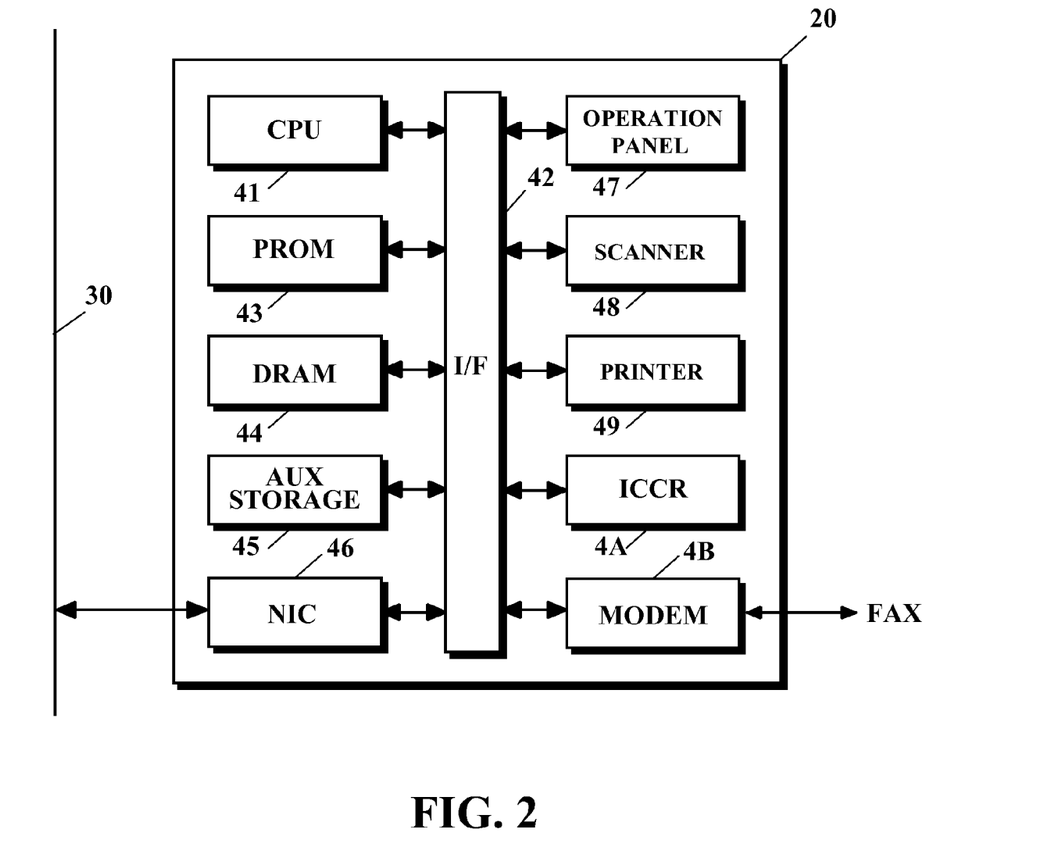
FIG. 2 illustrates a block diagram of a hardware configuration of an image forming apparatus within the image forming system.

FIG. 2 illustrates a block diagram of a hardware configuration of the image forming apparatus 20.

In the image forming apparatus 20, a CPU 41 is coupled to a PROM 43, a DRAM 44, an auxiliary storage device (AUX STORAGE) 45, a network interface card (NIC) 46, an operation panel 47, a scanner 48, a printer 49, an IC card reader (ICCR) 4A, and a FAX modem (MODEM) 4B via an interface (I/F) 42. In FIG. 2, several different of kinds of interfaces are represented by one block element 42.

The PROM 43 may be, for example, a flash memory, that stores a basic input/output system (BIOS), an operating system (OS), various drivers, and various applications for implementing functions of an image forming apparatus. The DRAM 44 is used as a main storage device. The auxiliary storage device 45 saves, as data files, data for printing, image data read by the scanner 48, and document data and facsimile reception data that are received from the PCs 10 to 1N. The network interface card 46 is coupled to the network 30. The operation panel 47 includes an input unit and a display unit. The scanner 48 is used for converting an image on a paper medium into an electronic file, which is used for printing, facsimile transmission, or file transmission. The printer 49 includes a print engine along with a sheet feeding unit, transport unit, and delivery unit for paper. Bitmap data generated on the DRAM 44 is supplied to the printer 49, an electrostatic latent image is formed on a photoconductor drum based on the bitmap data, toner is used to develop the electrostatic latent image, a toner image is transferred onto paper and fixed thereto, and the paper is delivered. The IC card reader 4A performs user authentication by communicating to/from an IC card using radio waves.

The configurations of the image forming apparatus 21 and 22 illustrated in FIG. 1 are the same as the configuration of the image forming apparatus 20.

Figure 3:
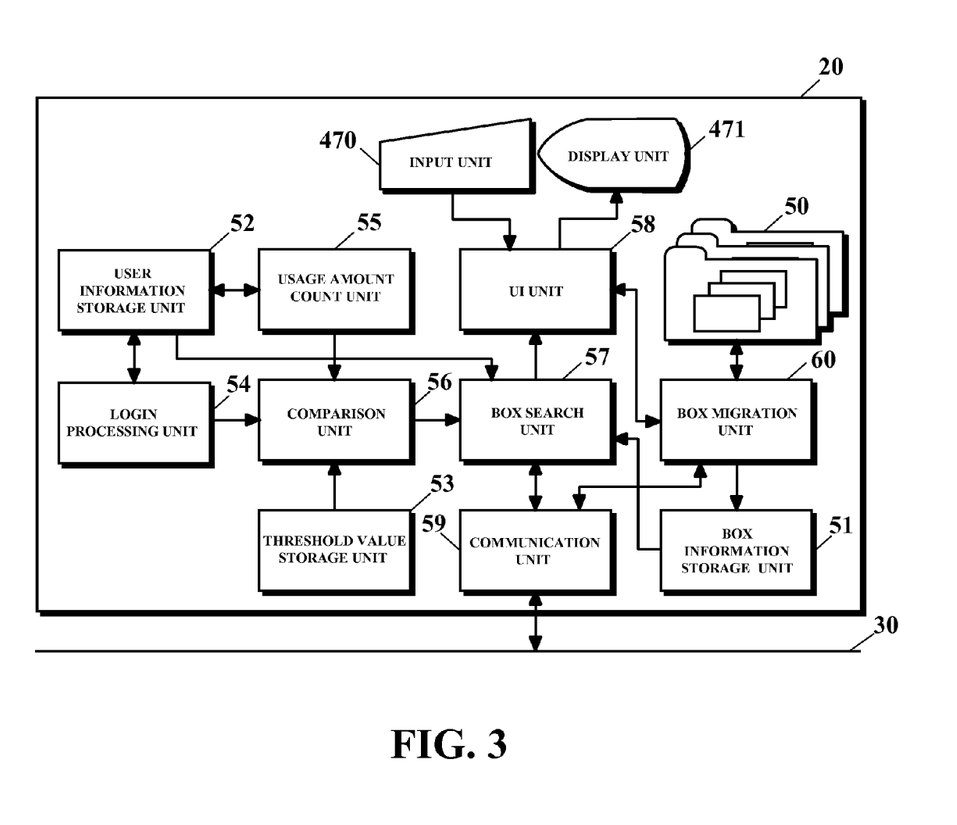
FIG. 3 illustrates a block diagram of a functional configuration of the image forming apparatus.
Figure 4:
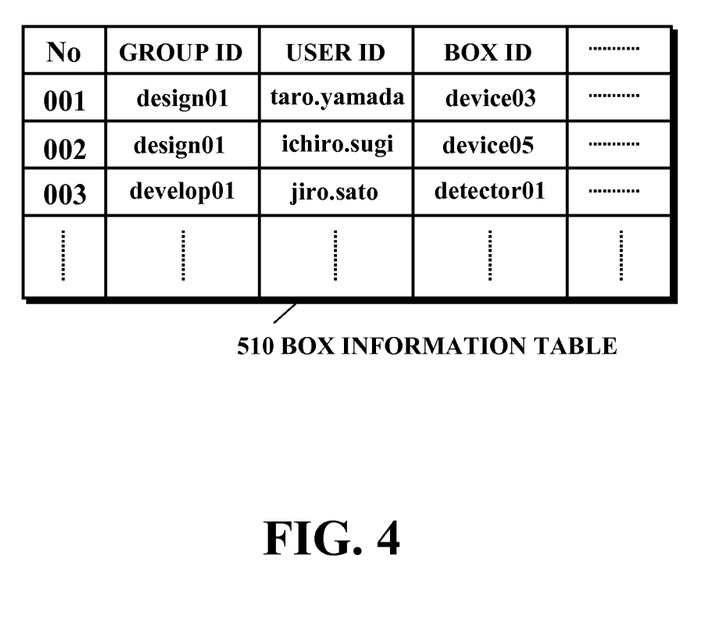
FIG. 4 illustrates a schematic diagram of a structure of a box information table.

FIG. 3 illustrates a block diagram of a functional configuration of the image forming apparatus 20. FIG. 4 illustrates a schematic diagram of a structure of a box information table 510.

In FIG. 3, box directories 50 are created in the auxiliary storage device 45 to store data regarding users and/or data shared by groups. A box information storage unit 51, a user information storage unit 52, and a threshold value storage unit 53 are stored in the PROM 43.

The box information storage unit 51 stores the box information table 510 as illustrated in FIG. 4. The box information table 510 includes a serial number ("No") field, a group identification ("group ID") field, a user identification ("user ID") field, and a box identification ("box ID") field. Each field corresponds to a name of a directory within a hierarchical structure. For example, a path having the box identification of "device03" corresponding to the serial number "001" is expressed as "C:Boxes\design01\taro.yamada\device03".

In other words, a folder corresponding to each group identification is created under a specific path "C:\Boxes", and a folder corresponding to each user identification is created in the folder specified by the group identification of the group to which the user belongs. The folder corresponding to the box identification is created in the folder of the user identification of the owner of the box. Therefore, when the user identification is specified, the path to each box name of boxes owned by the user is acquired by referring to the box information table 510.

Note that, the path having the box identification of device03 may be expressed as "C:\Boxes\taro.yamada\device03", and the group identification of the group to which the user ID belongs may be registered in another table.

Returning to FIG. 3, the user information storage unit 52 stores a table including a user identification field, a password field, and a usage amount field. The usage amount field indicates the usage amount for each user identification, and includes, for example, the total number of logins, the total number of times of printing, the total number of printed sheets, the total number of data transmissions, and the total number of pieces of in-box data that correspond to the user identification. Using such information, it is possible to predict that the user moved to a department in which the image forming apparatus 20 is installed to use the image forming apparatus 20. The threshold value storage unit 53 stores threshold values that correspond to each usage amount kind.

An input unit 470 and a display unit 471 are included in the operation panel 47 (FIG. 2). Functional blocks 55 to 60 function as a result of CPU 41 executing a program of the PROM 43.

Figure 5:
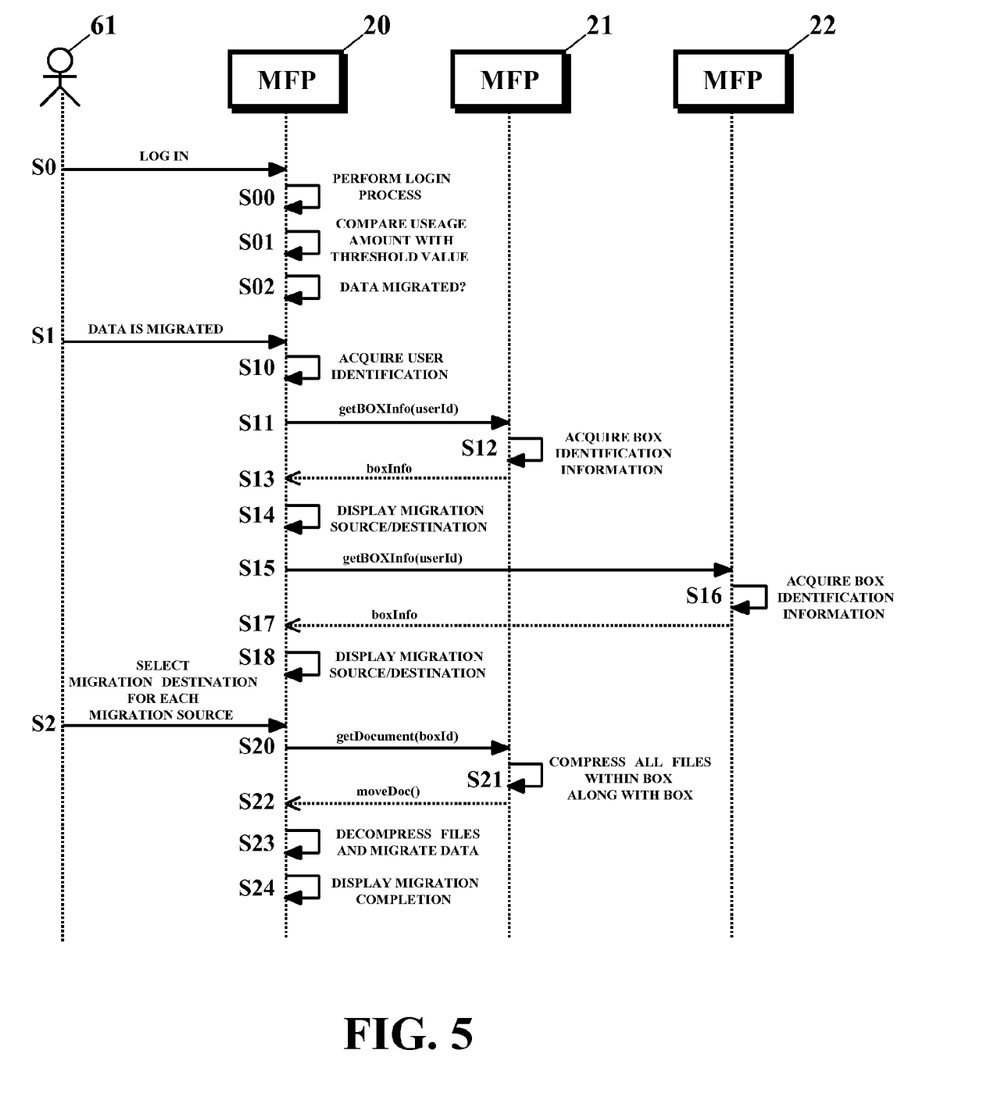
FIG. 5 illustrates a schematic diagram of a sequence followed when a user uses the image forming apparatus according to the first embodiment.

FIG. 5 illustrates a sequence diagram of a sequence followed when a user 61 uses the image forming apparatus 20. The sequence is described below with reference to FIG. 5 and FIG. 3.

In Step S0, the user 61 brings an IC card into proximity to an IC card reader 4A, and causes the IC card reader 4A to read the authentication information from the IC card.

In Step S00, in response thereto, a login processing unit 54 compares the authentication information (user identification and password) acquired by the IC card reader 4A with corresponding authentication information stored in the user information storage unit 52 to perform the authentication.

When the authentication is successful, in the case where the usage amount is the number of logins, a usage amount count unit 55 increments the usage amount of the user identification by one. In the case where the usage amount is the total number of times of printing, the total number of printed sheets, the total number of data transmissions, or the total number of pieces of in-box data, the usage amount is incremented by one in response to an occurrence of an event (for example, data printing completion event or one-page printing completion event) corresponding to each thereof.

In Step S01, in response to a successful authentication, a comparison unit 56 compares the usage amount with the threshold value stored in the threshold value storage unit 53. When the usage amount is equal to or larger than the threshold value, control is passed to a box search unit 57. When the usage amount is less than the threshold value, the control is passed to a system control unit (not illustrated).

On the display unit 471, a main menu used to select functions is displayed. Through the main menu, the threshold value may be set for each user, and an arbitrary threshold value may be set. The threshold value may be arbitrarily set by an administrator, for example.

In Step S02, the box search unit 57 displays, on the display unit 471 through a UI unit 58, a screen that queries whether or not to migrate data on the box of the user to a box within a different image forming apparatus.

In Step S1, when the user 61 operates the input unit 470 to make a positive response, the box search unit 57 is notified of the response through the UI unit 58. When the user 61 makes a negative response, the control is passed to the system control unit.

In Step S10, in response to the notification through the UI unit 58, the box search unit 57 acquires the user identification from the user information storage unit 52.

In Step S11, the box search unit 57 uses the user identification as a parameter value to make a Web service request to the image forming apparatus 21 for acquisition of box identification information via a communication unit 59 and the network 30. The communication unit 59 includes communication programs for a Web service client and a Web service provider.

In Steps S12 and S13, in response to the Web service request, the image forming apparatus 21 refers to the box information table 510 within the image forming apparatus 21. The user identification is registered in the image forming apparatus 21, and when the box name of the box owned by the user exists in the image forming apparatus 21, the box name is returned. When the box name of the box owned by the user does not exist in the image forming apparatus 21, the fact that the box name does not exist is returned.

Figure 6:
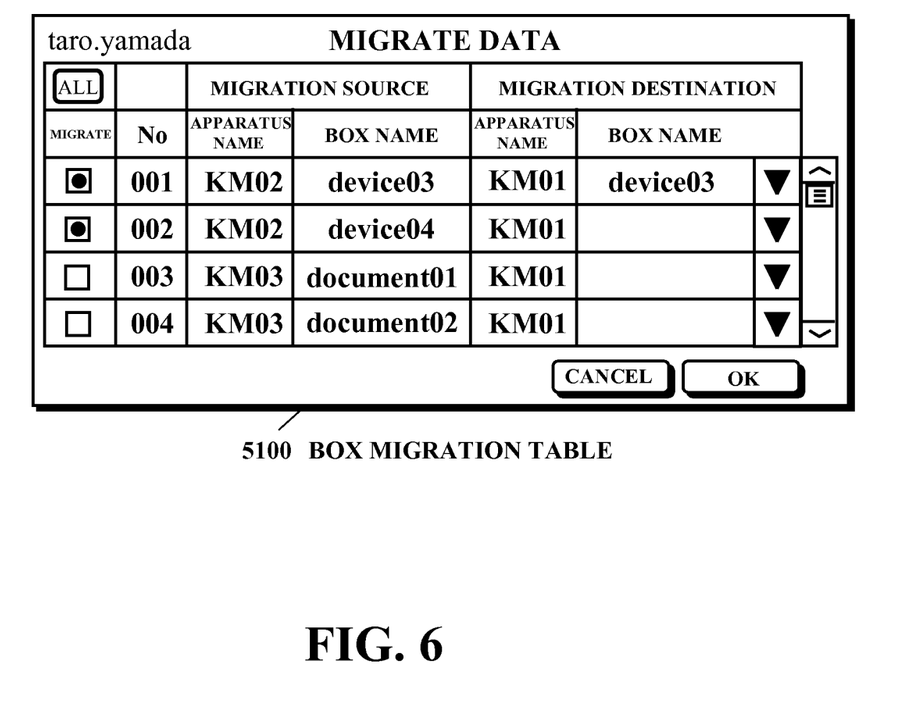
FIG. 6 illustrates a schematic diagram of a structure of a box migration table.

FIG. 6 illustrates a schematic diagram of a structure of a box migration table 5100.

In Step S14, in response to the reply, the box search unit 57 refers to the box information table 510 within the image forming apparatus 20 to display, as illustrated in FIG. 6, an image forming apparatus name and the box name for each of a migration source and a migration destination of the data migration between the image forming apparatus, on the display unit 471 through the UI unit 58. When the same box name as a migration source box name exists in the box information table 510, the box search unit 57 sets a migration destination box name to be the same as the migration source box name. When the same box name as the migration source box name does not exist in the box information table 510, the box search unit 57 sets the migration destination box name to be a blank. The migration destination box name can be changed by selecting an item from a drop-down list that is displayed when an arrow button is depressed. The data on the box is migrated, when the migration source box name and the migration destination box name are the same. The box and the data on the box are migrated, when the migration destination box name is blank.

In Steps S15, S16, S17, and S18, the box search unit 57 performs the same process as the above-described process for the other image forming apparatus coupled to the network 30 other than the image forming apparatus 21. Accordingly, a row is added to the box migration table 5100 of FIG. 6.

In Step S2, in the box migration table 5100 displayed on the display unit 471, the user 61 checks the row indicating the migration to the image forming apparatus 20, and changes the migration destination box name as necessary. When an OK button is depressed in the box migration table 5100, a box migration unit 60 is notified of displayed contents through the UI unit 58.

In Step S20, in response to the notification, the box migration unit 60 uses the migration source box name as the parameter value to make a Web service request to the image forming apparatus of the migration source of the selected row for box migration to the image forming apparatus 20, via the network 30.

In Step S21, in response to the Web service request, the box migration unit 60 refers to the box information table 510 to determine a path to the box of the box name. The box migration unit 60 archives and compresses all files included in the box along with the box.

In Step S22, the image forming apparatus 21 returns any compressed data thereon to the image forming apparatus 20.

In Step S23, the box migration unit 60 decompresses the compressed data, and refers to the box information table 510 to migrate, when the box having the same box name exists in the box directory 50, the decompressed data file to the box. When the box having the same box name does not exist in the box directory 50, the box migration unit 60 migrates the box of the box name along with contents thereof to a directory corresponding to the user identification.

In Step S24, the box migration unit 60 displays the fact that migration of a box has been completed on the display unit 471 through the UI unit 58.

The user 61 who has viewed the displaying of box migration completion depresses the OK button through the input unit 470. Accordingly, the control is passed to the system control unit.

According to the first embodiment, in the image forming apparatus, when the usage amount of the user identification registered in the image forming apparatus is equal to or larger than the threshold value, for example, when the usage amount (that allows a prediction that the user moves to a department in which the image forming apparatus is installed to use the image forming apparatus) has changed from zero to a predetermined value equal to or larger than the threshold value, the box identification information on the box corresponding to the user identification is acquired from another image forming apparatus. Then, the data on the box specified by the box identification information within the other image forming apparatus is migrated to the box corresponding to the user identification. Therefore, even if the user does not know that the image forming apparatus has the box migration function, the box migration function can be easily used automatically at an appropriate timing.

Second Embodiment

Figure 7:
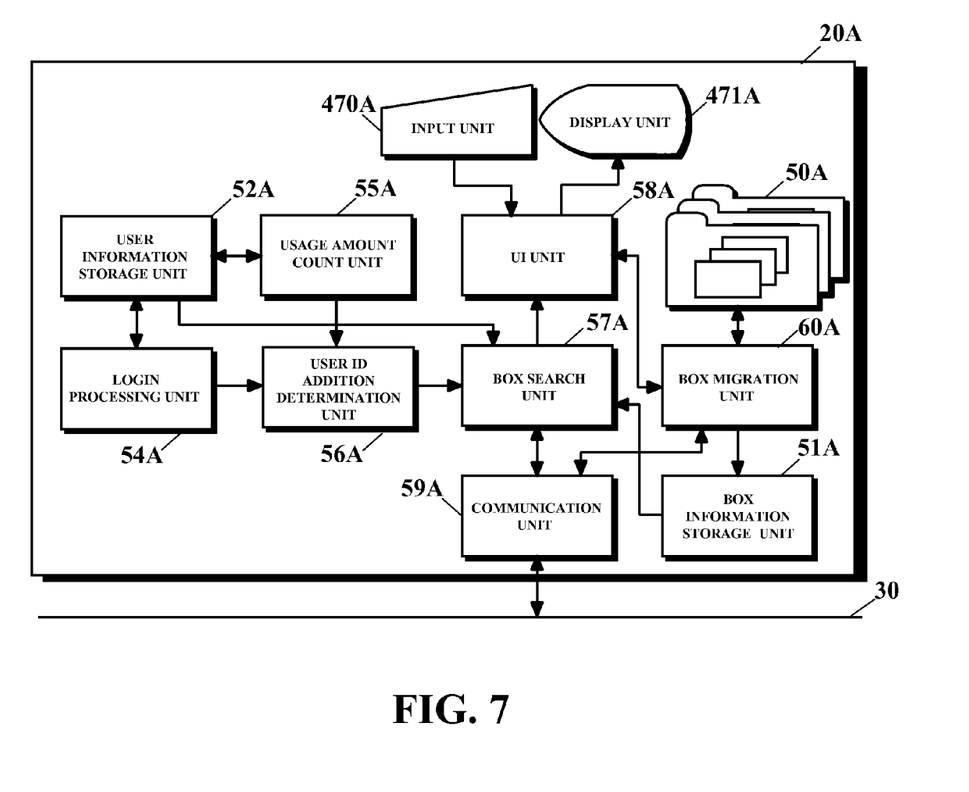
FIG. 7 illustrates a block diagram of a functional configuration of an image forming apparatus according to a second embodiment of the present disclosure.

FIG. 7 illustrates a block diagram of a functional configuration of an image forming apparatus according to a second embodiment of the present disclosure.

An image forming apparatus 20A illustrated in FIG. 7 includes a user ID addition determination unit 56A, in place of the usage amount count unit 55, the comparison unit 56, and the threshold value storage unit 53 of the image forming apparatus 20 illustrated in FIG. 3. The user ID addition determination unit 56A determines whether or not the user identification has been newly registered in the user information storage unit 52A, and when determining that the user identification has been newly registered, passes the control to the box search unit 57A. When it is not determined that the user identification has been newly registered, the control is passed to the above-described system control unit.

The other configurations of functional blocks in FIG. 7 are the same as the configurations of the functional blocks in FIG. 3.

According to the second embodiment, the user identification has been newly registered in the image forming apparatus, the box migration process is performed. Therefore, for example, as soon as the user moves to the department to use the image forming apparatus, the box migration between the image forming apparatus can be performed.

Third Embodiment

Figure 8:
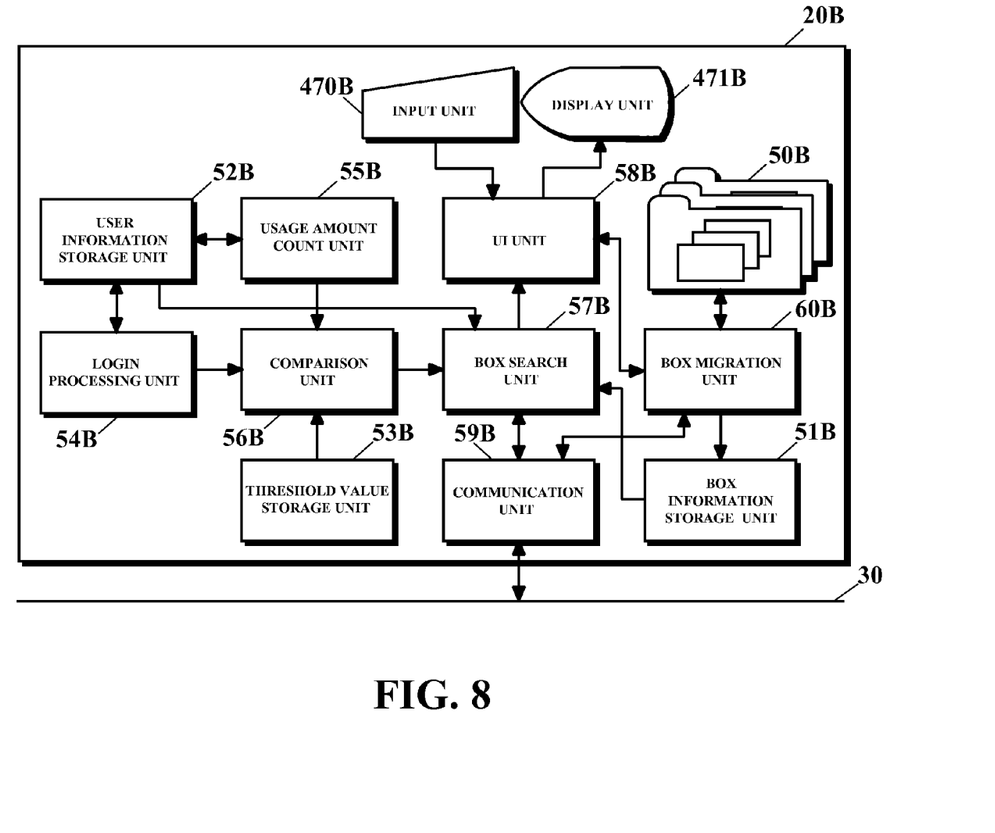
FIG. 8 illustrates a block diagram of a functional configuration of an image forming apparatus according to a third embodiment of the present disclosure.

FIG. 8 illustrates a block diagram of a functional configuration of an image forming apparatus according to a third embodiment of the present disclosure.

The configurations of the functional blocks 50B to 52B, 54B, 56B, 58B, and 59B of an image forming apparatus 20B are the same as the configurations of the functional blocks 50 to 52, 54, 56, 58, and 59 of the image forming apparatus 20 illustrated in FIG. 3.

Figure 9:
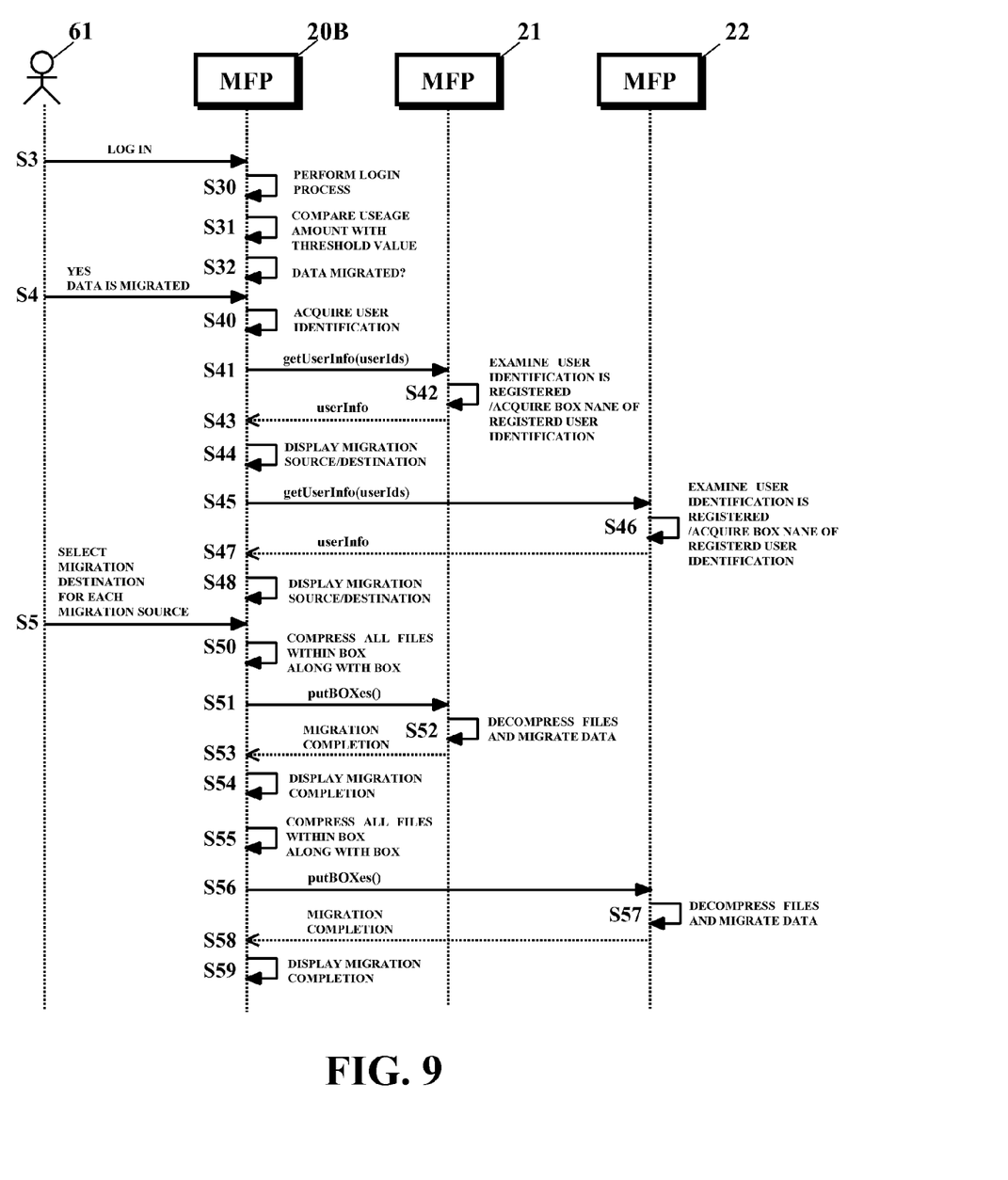
FIG. 9 illustrates a sequence diagram of a sequence followed when the user uses the image forming apparatus according to the third embodiment.

FIG. 9 illustrates a sequence diagram of a sequence followed when the user 61 uses the image forming apparatus 20B. The sequence is described below with reference to FIG. 8 and FIG. 9.

In Step S3, the user 61 brings the IC card into proximity to the IC card reader 4A, and causes the IC card reader 4A to read the authentication information from the IC card.

In Step S30, in response thereto, the login processing unit 54B compares the authentication information (user identification and password) acquired by the IC card reader with the corresponding authentication information stored in the user information storage unit 52B to perform the authentication.

A usage amount count unit 55B counts the usage amount on the image forming apparatus 20B. The usage amount includes, for example, the total number of printed sheets, the total number of times of printing, the total number of data transmissions, the total number of used toner cartridges, and the total used hours of the image forming apparatus 20B, based on which it is possible to predict a timing to replace the image forming apparatus 20B. A threshold value storage unit 53B stores threshold values corresponding to the respective kinds of usage amount.

In Step S31, in response to a success in the authentication, the comparison unit 56B compares the usage amount with the threshold value stored in the threshold value storage unit 53B. When the usage amount is equal to or larger than the threshold value, the control is passed to a box search unit 57B. When the usage amount is less than the threshold value, the control is passed to the system control unit.

In Step S32, the box search unit 57B displays a screen that queries whether or not to migrate the box within the image forming apparatus 20B to the other image forming apparatus, on the display unit 471B through the UI unit 58B.

In Step S4, when the user 61 operates the input unit 470B to make a positive response, the box search unit 57B is notified of the response through the UI unit 58B. When the user 61 makes a negative response, the control is passed to the system control unit.

In Steps S40 and S41, the box search unit 57A transmits the user identification of the user information storage unit 52B to the image forming apparatus 21 via the communication unit 59B and the network 30. The box search unit 57B makes a Web service request for a reply as whether or not the user identification is registered in the image forming apparatus 21.

In Steps S42 and S43, in response to the Web service request, the image forming apparatus 21 examines whether or not the user identification is registered in the user information storage unit 52. The image forming apparatus 21 refers to the box information table 510 to acquire the box name of the registered user identification, and returns results thereof to the image forming apparatus 20B.

In Step S44, the box search unit 57B refers to the box information table 510 of the image forming apparatus 20B to display, as illustrated in FIG. 6, the image forming apparatus name and the box name for each of the migration source and the migration destination of the data migration, on the display unit 471B through the UI unit 58B. When the same box name as the migration destination box name exists in the box information table 510, the box search unit 57B sets the migration destination box name to be the same as the migration source box name. When the same box name as the migration destination box name does not exist in the box information table 510, the box search unit 57B sets the migration destination box name to be a blank. The migration destination box name can be changed by selecting an item from the drop-down list that is displayed when the arrow button is depressed. The data on the box is migrated, when the migration source box name and the migration destination box name are the same. The box and the data on the box are migrated, when the migration destination box name is blank.

In Steps S45, S46, S47, and S48, the box search unit 57B performs the same process as the above-described process for another image forming apparatus coupled to the network 30 other than the image forming apparatus 20B.

In Step S5, in the box migration table 5100 displayed on the display unit 471B, the user 61 checks the row indicating that the box within the image forming apparatus 20B is to be migrated to the other image forming apparatus, and changes the migration destination box name as necessary. When the OK button is depressed, a box migration unit 60B is notified of the displayed contents through the UI unit 58B.

In Step S50, in response to the notification, the box migration unit 60B refers to the box information table 510 to determine the path to the selected box name. The box migration unit 60B archives and compresses all the files included in the box along with the box.

In Step S51, the box migration unit 60B transmits the compressed data along with the user identification to the image forming apparatus 21 of the migration destination, and makes the Web service request for the box migration.

In Step S52, the box migration unit 60B decompresses the compressed data, and when the same box name as the box name of the decompressed box relating to the user identification exists in the box information storage unit 51B, migrates the decompressed data file to the box within the box directory 50B. When the same box name as that of the decompressed box does not exist in the box information storage unit 51B, the box migration unit 60B migrates the box of the box name along with the decompressed data file to the directory corresponding to the user identification.

In Step S53, the image forming apparatus 21 notifies the image forming apparatus 20B to the effect that the migration has been completed.

In Step S54, the box migration unit 60B displays the fact that migration of the box to the image forming apparatus 21 has been completed on the display unit 471B through the UI unit 58B.

In Steps S55, S56, S57, S58 and S59, the box search unit 60B performs the same process as the above-described process of Steps S50 to S54 for the other image forming apparatus coupled to the network 30 other than the image forming apparatus 20B.

According to the third embodiment, in the image forming apparatus, when the usage amount on the image forming apparatus is equal to or larger than the threshold value, for example, when the usage amount that allows a prediction of the timing to replace the image forming apparatus has changed from zero to the predetermined value equal to or larger than the threshold value, the box identification information on the boxes corresponding to the user identification registered in the image forming apparatus is acquired from the other image forming apparatus. Then, the data on the boxes corresponding to the user identification within the image forming apparatus is migrated to the box specified by the box identification information on the other image forming apparatus. Therefore, even if the user does not know that the image forming apparatus has the box migration function, for example, the box migration function can be easily used at the time of replacement to replace the image forming apparatus.

While various aspects and embodiments have been disclosed herein, other aspects and embodiments are possible. Other designs may be used in which the above-described components are each present.

For example, in the first embodiment, when the comparison unit 56 of the image forming apparatus 20 determines that the usage amount of the user is equal to or larger than a first threshold value, the other image forming apparatus may be queried whether or not the usage amount of the user on the other image forming apparatus is equal to or smaller than a second threshold value. When there is a positive reply as a result, the control may be passed to the box search unit 57. Accordingly, the data may be migrated from the box of the other image forming apparatus now used by the user less often to the box of the image forming apparatus 20 that is currently being used. The box migration function can be used at a more appropriate timing.

For the same reason as above-description, in the second embodiment, when the user ID addition determination unit 56A of the image forming apparatus 20A determines that the user identification has been newly registered in the user information storage unit 52A, the other image forming apparatus corresponding to the user identification may be queried whether or not the usage amount on the other image forming apparatus is equal to or smaller than the threshold value. When there is a positive reply as a result, the control may be passed to the box search unit 57.

Further, in the third embodiment, if the comparison unit 56B of a given image forming apparatus determines that the usage amount on the image forming apparatus 20B is equal to or larger than the threshold value, when it is determined that a new image forming apparatus has been coupled to the network 30 for a specified period (for example, at least one week), the control may be passed to the box search unit 57B. Accordingly, the box of the user may be migrated to the image forming apparatus that has been newly registered in a network when it is time to replace the image forming apparatus. The box migration function can be used at a more appropriate timing.

Further, in the third embodiment, a box migration processing completion flag may be included for the user identification. In FIG. 9, for each of the user identifications, when all the box migration processing completion flags are not set, the process of Step S40 and the subsequent steps may be repeatedly performed. Accordingly, it is easy to determine whether or not the box has been migrated to the other image forming apparatus for all the users registered in the image forming apparatus 20B, which alleviates load on the administrator.

Further, in the first, second, and third embodiments, a management server may be coupled to the network 30 to manage the box identification information, the user identification, and information indicating when the image forming apparatus 20, 20A, or 20B was installed, and the like. At a time of box migration process, the above-described information may be acquired from the management server, instead of from the other image forming apparatus, via the network 30.

Further, in the first, second, and third embodiments, the display unit and a user interface unit may be provided in the PCs 10 to 1N instead of being provided in the image forming apparatus 20 (20A or 20B), 21, and 22 illustrated in FIG. 1.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus configured to be coupled to a network, comprising:
   a box configured to store data, wherein the box corresponds to a user identification;
   a display unit;
   a box information storage unit configured to store a box information table;
   a usage amount count unit configured to count a usage amount for the user identification registered in the image forming apparatus;
   a threshold value storage unit configured to store a first threshold value associated with the usage amount;
   a comparison unit configured to determine whether or not the usage amount is equal to or larger than the threshold value;
   a box search unit configured to acquire, if i) a user having the user identification moves to a department in which the image forming apparatus is installed to use the image forming apparatus, ii) the usage amount corresponding to the user identification within the image forming apparatus that is currently being used is equal to or larger than the first threshold value and iii) the usage amount corresponding to the user identification within another image forming apparatus now used by the user less often coupled to the network is equal to or smaller than a second threshold value, a box name serving as box identification information that defines the box corresponding to the user identification within the other image forming apparatus now used by the user less often coupled to the network;
   a user interface unit configured to display a list of the acquired box identification information on the display unit, wherein the box identification information can be selected from the list through the display unit; and a box migration unit configured to migrate, via the network, the data on the box within the other image forming apparatus specified by the selected box identification information to the box corresponding to the user identification within the image forming apparatus, wherein, if the comparison unit determines that the usage amount of the user is equal to or larger than the first threshold value, the comparison unit queries the other image forming apparatus whether or not the usage amount of the user on the other image forming apparatus is equal to or smaller than the second threshold value, wherein, if there is a positive reply indicating that the usage amount of the user on the other image forming apparatus is equal to or smaller than the second threshold value, a control is passed to the box search unit, wherein the box search unit refers to the box information table within the image forming apparatus to display, on the display unit via the user interface unit, the list including i) an image forming apparatus name, ii) a migration source box name serving as the box name for a migration source, and iii) a migration destination box name serving as the box name for a migration destination, wherein, if the same box name as the migration source box name exists in the box information table, the box search unit sets the migration destination box name to be the same as the migration source box name, wherein, if the same box name as the migration source box name does not exist in the box information table, the box search unit sets the migration destination box name to be a blank, wherein if the migration source box name and the migration destination box name are the same, the data on the box is migrated, wherein, if the migration destination box name is blank, the box and the data on the box are migrated, wherein the usage amount includes at least one of a total number of logins, a total number of printed sheets, and a total number of pieces of in-box data that corresponds to the user identification, and wherein the data on the box is migrated from the box of the other image forming apparatus now used by the user less often to the box of the image forming apparatus that is currently being used.

2. The image forming apparatus according to claim 1, wherein the box search unit is further configured to acquire the box identification information within the other image forming apparatus from a management server coupled to the network.

3. The image forming apparatus according to claim 1, wherein the display unit and the user interface unit are included in a terminal device coupled to the network.

4. An image forming apparatus configured to be coupled to a network, comprising:
a box configured to store data, wherein the box corresponds to a user identification;
a display unit;
a box information storage unit configured to store a box information table;
a user ID addition determination unit configured to determine whether or not the user identification has been newly registered in the image forming apparatus;
a box search unit configured to acquire, if i) a user having the user identification moves to a department in which the image forming apparatus is installed to use the image forming apparatus, ii) the user identification has been newly registered in the image forming apparatus, and iii) the usage amount corresponding to the user identification within another image forming apparatus now used by the user less often coupled to the network is equal to or smaller than a threshold value, a box name serving as box identification information that defines the box corresponding to the user identification within the other image forming apparatus now used by the user less often coupled to the network;
a user interface unit configured to display a list of the acquired box identification information on the display unit, wherein the box identification information can be selected from the list through the display unit; and
a box migration unit configured to migrate, via the network, the data on the box within the other image forming apparatus specified by the selected box identification information to the box corresponding to the user identification within the image forming apparatus, wherein, if the user ID addition determination unit determines that the user identification has been newly registered in the image forming apparatus, the user ID addition determination unit queries the other image forming apparatus whether or not the usage amount of the user on the other image forming apparatus is equal to or smaller than the threshold value, wherein, if there is a positive reply indicating that the usage amount of the user on the other image forming apparatus is equal to or smaller than the threshold value, a control is passed to the box search unit, wherein the box search unit refers to the box information table within the image forming apparatus to display on the display unit via the user interface unit, the list including i) an image forming apparatus name, ii) a migration source box name serving as the box name for a migration source, and iii) a migration destination box name serving as the box name for a migration destination, wherein, if the same box name as the migration source box name exists in the box information table, the box search unit sets the migration destination box name to be the same as the migration source box name, wherein, if the same box name as the migration source box name does not exist in the box information table, the box search unit sets the migration destination box name to be a blank, wherein, if the migration source box name and the migration destination box name are the same, the data on the box is migrated, wherein, if the migration destination box name is blank, the box and the data on the box are migrated, wherein the usage amount includes at least one of a total number of logins, a total number of printed sheets, and a total number of pieces of in-box data that correspond to the user identification, and wherein the data on the box is migrated from the box of the other image forming apparatus now used by the user less often to the box of the image forming apparatus that is currently being used.

5. The image forming apparatus according to claim 4, wherein the box search unit is further configured to acquire the box identification information within the other image forming apparatus from a management server coupled to the network.

6. The image forming apparatus according to claim 4, wherein the display unit and the user interface unit are included in a terminal device coupled to the network.

7. An image forming apparatus configured to be coupled to a network, comprising:
a box configured to store data, wherein the box corresponds to a user identification;

a display unit;
a box information storage unit configured to store a box information table;
a usage amount count unit configured to count a usage amount in the image forming apparatus, wherein the usage amount predicts a timing to replace the image forming apparatus;
a threshold value storage unit configured to store a threshold value associated with the usage amount;
a comparison unit configured to determine whether or not the usage amount is equal to or larger than the threshold value;
a box search unit configured to acquire, if i) the usage amount for predicting the timing to replace the image forming apparatus is equal to or larger than the threshold value, and ii) a new image forming apparatus is coupled to the network, a box name serving as box identification information that defines the box corresponding to the user identification registered within another image forming apparatus serving as the new image forming apparatus coupled to the network;
a user interface unit configured to display a list of the acquired box identification information on the display unit, wherein the box identification information can be selected from the list through the display unit; and
a box migration unit configured to migrate, via the network, the data on the box corresponding to the user identification within the image forming apparatus to the box of the other image forming apparatus specified by the selected box identification information,
wherein, if the comparison unit determines that the usage amount on the image forming apparatus is equal to or larger than the threshold value, and if it is determined that the new image forming apparatus has been coupled to the network for a specified period, a control is passed to the box search unit,
wherein the box search unit refers to the box information table within the image forming apparatus to display on the display unit via the user interface unit, the list including i) an image forming apparatus name, ii) a migration source box name serving as the box name for a migration source, and iii) a migration destination box name serving as the box name for a migration destination,
wherein, if the same box name as the migration source box name exists in the box information table, the box search unit sets the migration destination box name to be the same as the migration source box name,
wherein, if the same box name as the migration source box name does not exist in the box information table, the box search unit sets the migration destination box name to be a blank,
wherein, if the migration source box name and the migration destination box name are the same, the data on the box is migrated,
wherein, if the migration destination box name is blank, the box and the data on the box are migrated,
wherein the usage amount for predicting the timing to replace the image forming apparatus includes at least one of a total number of printed sheets, a total number of data transmissions, a total number of used toner cartridges, and a total used hours of the image forming apparatus, and
wherein the data on the box is migrated from the box of the image forming apparatus to the box of the new image forming apparatus coupled to the network, when it is time to replace the image forming apparatus.

8. The image forming apparatus according to claim 7, wherein:
the user identification includes a box migration processing completion flag;
the box search unit, the user interface unit, and the box migration unit are each configured to perform processes for the user identification; and
the box migration processing completion flag is set after the process is completed.

9. The image forming apparatus according to claim 7, wherein the box search unit is further configured to acquire the box identification information within the other image forming apparatus from a management server coupled to the network.

10. The image forming apparatus according to claim 7, wherein the display unit and the user interface unit are included in a terminal device coupled to the network.

11. A method by an image forming apparatus that includes a box corresponding to a user identification configured to store data, and a display unit, comprising:
storing, using a box information storage unit, a box information table;
counting, using a usage amount count unit, a usage amount for the user identification registered in the image forming apparatus configured to be coupled to a network;
storing, using a threshold value storage unit, a first threshold value that is associated with the usage amount;
determining, using a comparison unit, whether or not the usage amount is equal to or larger than the first threshold value;
acquiring, using a box search unit, if i) a user having the user identification moves to a department in which the image forming apparatus is installed to use the image forming apparatus, ii) the usage amount corresponding to the user identification within the image forming apparatus that is currently being used is equal to or larger than the first threshold value, and iii the usage amount corresponding to the user identification within another image forming apparatus now used by the user less often coupled to the network is equal to or smaller than a second threshold value, a box name serving as box identification information that defines a box corresponding to the user identification within the other image forming apparatus now used by the user less often coupled to the network;
displaying, using a user interface unit, a list of the acquired box identification information on the display unit, wherein the box identification information can be selected from the list through the display unit; and
migrating via the network, using a box migration unit, data on the box within the other image forming apparatus specified by the selected box identification information to the box corresponding to the user identification within the image forming apparatus,
wherein, if the comparison unit determines that the usage amount of the user is equal to or larger than the first threshold value, the comparison unit queries the other image forming apparatus whether or not the usage amount of the user on the other image forming apparatus is equal to or smaller than the second threshold value,
wherein, if there is a positive reply indicating that the usage amount of the user on the other image forming apparatus is equal to or smaller than the second threshold value, a control is passed to the box search unit,
wherein the box search unit refers to the box information table within the image forming apparatus to display on the display unit via the user interface unit, the list including i) an image forming apparatus name, ii) a migration source box name serving as the box name for the migration source, and iii) a migration destination box name serving as the box name for a migration destination, wherein, if the same box name as the migration source box name exists in the box information table, the box search unit sets the migration destination box name to be the same as the migration source box name, wherein, if the same box name as the migration source box name does not exist in the box information table, the box search unit sets the migration destination box name to be a blank, wherein, if the migration source box name and the migration destination box name are the same, the data on the box is migrated, wherein, if the migration destination box name is blank, the box and the data on the box are migrated, wherein the usage amount includes at least one of a total number of logins, a total number of printed sheets, and a total number of pieces of in-box data that correspond to the user identification, and wherein the data on the box is migrated from the box of the other image forming apparatus now being used by the user less often to the box of the image forming apparatus that is currently being used.

12. A method by an image forming apparatus that includes a box corresponding to a user identification configured to store data, and a display unit, comprising:

storing, using a box information storage unit, a box information table;

determining, using a user ID addition determination unit, whether or not the user identification has been newly registered in the image forming apparatus;

acquiring, using a box search unit, if i) a user having the user identification moves to a department in which the image forming apparatus is installed to use the image forming apparatus, ii) the user identification has been newly registered, and iii) a usage amount corresponding to the user identification within another image forming apparatus now used by the user less often coupled to the network is equal to or smaller than a threshold value, box identification information that defines a box corresponding to the user identification within the other image forming apparatus now used by the user less often coupled to the network;

displaying, using a user interface unit, a list of the acquired box identification information on the display unit, wherein the box identification information can be selected from the list through the display unit; and migrating via the network, using a box migration unit, the data on the box within the other image forming apparatus specified by the selected box identification information to the box corresponding to the user identification within the image forming apparatus, wherein, if the user ID addition determination unit determines that the user identification has been newly registered in the image forming apparatus, the user ID addition determination unit queries the other image forming apparatus whether or not the usage amount of the user on the other image forming apparatus is equal to or smaller than the threshold value, wherein, if there is a positive reply indicating that the usage amount of the user on the other image forming apparatus is equal to or smaller than the threshold value, a control is passed to the box search unit, wherein the box search unit refers to the box information table within the image forming apparatus to display on the display unit via the user interface unit, the list including i) an image forming apparatus name, ii) a migration source box name serving as the box name for a migration source, and iii) a migration destination box name serving as the box name for a migration destination, wherein, if the same box name as the migration source box name exists in the box information table, the box search unit sets the migration destination box name to be the same as the migration source box name, wherein, if the same box name as the migration source box name does not exist in the box information table, the box search unit sets the migration destination box name to be a blank, wherein, if the migration source box name and the migration destination box name are the same, the data on the box is migrated, wherein, if the migration destination box name is blank, the box and the data on the box are migrated, wherein the usage amount includes at least one of a total number of logins, a total number of printed sheets, and a total number of pieces of in-box data that correspond to the user identification, and wherein the data on the box is migrated from the box of the other image forming apparatus now used by the user less often to the box of the image forming apparatus that is currently being used.

13. A method by an image forming apparatus that includes a box corresponding to a user identification configured to store data, and a display unit, comprising:

storing, using a box information storage unit, a box information table;

counting, using a usage amount count unit, a usage amount in the image forming apparatus configured to be coupled to a network, wherein the usage amount predicts a timing to replace the image forming apparatus;

storing, using a threshold value storage unit, a threshold value associated with the usage amount;

determining, using a comparison unit, whether or not the usage amount is equal to or larger than the threshold value;

acquiring, using a box search unit, if i) the usage amount for predicting the timing to replace the image forming apparatus is equal to or larger than the threshold value, and ii) a new image forming apparatus is coupled to the network, a box name serving as box identification information that defines the box corresponding to the user identification registered within another image forming apparatus serving as the new image forming apparatus coupled to the network;

displaying, using a user interface unit, a list of the acquired box identification information on the display unit, wherein the box identification information can be selected from the list through the display unit; and migrating via the network, using a box migration unit, via the network, the data on the box corresponding to the user identification within the image forming apparatus to the box of the other image forming apparatus specified by the selected box identification information, wherein, if the comparison unit determines that the usage amount on the image forming apparatus is equal to or larger than the threshold value, and if it is determined that the new image forming apparatus has been coupled to the network for a specified period, a control is passed to the box search unit, wherein the box search unit refers to the box information table within the image forming apparatus to display on the display unit via the user interface unit, the list including i) an image forming apparatus name, ii) a migration source box name serving as the box name for a migration source, and iii) a migration destination box name serving as the box name for a migration destination, wherein, if the same box name as the migration source box name exists in the box information table, the box search unit sets the migration destination box name to be the same as the migration source box name, wherein, if the same box name as the migration source box name does not exist in the box information table, the box search unit sets the migration destination box name to be a blank, wherein, if the migration source box name and the migration destination box name are the same, the data on the box is migrated, wherein, if the migration destination box name is blank, the box and the data on the box are migrated, wherein the usage amount for predicting the time to replace the image forming apparatus includes at least one of a total number of printed sheets, a total number of data transmissions, a total number of used toner cartridges, and a total used hours of the image forming apparatus, and wherein the data on the box is migrated from the box of the image forming apparatus to the box of the new image forming apparatus coupled to the network, when it is time to replace the image forming apparatus.

* * * * *